United States Patent
Yun et al.

(10) Patent No.: US 9,285,935 B2
(45) Date of Patent: Mar. 15, 2016

(54) TOUCH SCREEN DEVICE

(71) Applicant: ZINITIX, Daejeon (KR)

(72) Inventors: Il Hyun Yun, Daejeon (KR); Hyung Cheol Shin, Daejeon (KR); Kyoung Kyoo Kim, Daegu (KR)

(73) Assignee: ZINITIX, Daejeon (KR)

( * ) Notice: Subject to any disclaimer, the term of this patent is extended or adjusted under 35 U.S.C. 154(b) by 26 days.

(21) Appl. No.: 14/053,478

(22) Filed: Oct. 14, 2013

(65) Prior Publication Data

US 2014/0043290 A1 Feb. 13, 2014

Related U.S. Application Data

(63) Continuation of application No. PCT/KR2012/002764, filed on Apr. 12, 2012.

(30) Foreign Application Priority Data

Apr. 20, 2011 (KR) .................. 10-2011-0036987

(51) Int. Cl.
*G06F 3/00* (2006.01)
*G06F 3/044* (2006.01)

(52) U.S. Cl.
CPC ...... *G06F 3/044* (2013.01); *G06F 2203/04112* (2013.01)

(58) Field of Classification Search
CPC ......... G06F 3/044; G06F 3/045; G06F 1/169; G06F 3/0412; G06F 3/047
See application file for complete search history.

(56) References Cited

U.S. PATENT DOCUMENTS

2012/0182254 A1* 7/2012 Jang et al. .................. 345/174
2012/0274603 A1* 11/2012 Kim et al. .................. 345/174

FOREIGN PATENT DOCUMENTS

| JP | 2010-108505 A | 5/2010 |
| KR | 10-2009-0098947 A | 9/2009 |
| KR | 10-2010-0095886 A | 9/2010 |
| WO | WO 2011-025213 A2 | 3/2011 |

OTHER PUBLICATIONS

International Search Report for PCT/KR2012/002764 filed on Apr. 12, 2012.

* cited by examiner

*Primary Examiner* — Michael Faragalla

(57) ABSTRACT

A capacitive type touch screen device according to an exemplary embodiment of the present invention includes a plurality of driving electrodes and a plurality of sensing electrodes overlapped with the plurality of driving electrodes, at least one driving electrode includes a plurality of cells and a plurality of connecting lines, and the plurality of cells are mutually connected through the plurality of connecting lines.

11 Claims, 6 Drawing Sheets

(a)

(b)

TOUCH SCREEN DEVICE

TECHNICAL FIELD

The present invention relates to a touch screen device, and more particularly, to a touch screen device having excellent sensing performance.

BACKGROUND ART

Display devices such as liquid crystal displays and organic light emitting diode displays, portable transmitting devices, and other information processing devices use various input devices to perform functions. Recently, one such input device, the touch screen device has been widely employed in mobile phones, smart phones, palm-size PCs, automated teller machines (ATMs), etc.

A finger, touch pen, stylus, etc. is used to contact the screen of a touch screen device to write characters, draw pictures, or execute an icon to perform a desired command.

Such touch screen devices can be categorized largely into resistive type and capacity type touch screen devices, depending on the method of sensing a touch.

A resistive type touch screen device has a structure in which a resistive material is coated on a glass or transparent plastic plate, over which a polyester film is then coated. Insulating rods are installed at uniform distances apart so as not to touch one another, between two surfaces of a resistive type touch screen device. Resistance changed by a touch on the screen changes voltage, which is detected to sense the touched position. A resistive type touch screen device has the drawback of being unable to sense a touch if the pressure is too light.

Conversely, a capacitive type touch screen device includes electrodes formed on one or both sides of glass or transparent plastic. A voltage is applied between two electrodes, and when a finger or other object contacts the screen, the variation in capacitance between the two electrodes is analyzed to sense the touched point.

A capacitive type touch screen device requires a sensing circuit to measure the capacitance formed between two electrodes in order to sense a touched point. A sensing circuit used in the touch screen device of a mobile phone or the like measures the variation in a capacitor formed between two electrodes of a touch screen panel. A method is required for increasing the variation in a capacitor in order to improve the sensing performance of a touch screen device.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a capacitive type touch screen device having advantages of excellent sensing performance.

Technical Solution

An exemplary embodiment of the present invention provides a capacitive type touch screen device, including: a plurality of driving electrodes; and a plurality of sensing electrodes overlapped with the plurality of driving electrodes, wherein at least one driving electrode includes a plurality of cells and a plurality of connecting lines, and the plurality of cells are mutually connected through the plurality of connecting lines.

A portion of the sensing electrodes may be overlapped with the connecting lines. All the cells of the plurality of cells may be divided into a first column cell group and a second column cell group which are sequentially connected through the connecting lines, and for each row, the cells included in the first column cell group may be connected to the cells included in the second column cell group through the connecting lines. At least one sensing electrode may be divided into two or more lines, and the divided lines may overlap with the connecting lines. The divided lines may be recombined at predetermined points, and at the predetermined points, the respective cells included in the first column cell group and the second column cell group may overlap with the connecting lines connected in each row. At least one sensing electrode may be divided into two or more lines, which may have a parallel structure that is recombined at least once.

The divided lines may overlap with the connecting lines.

Another exemplary embodiment of the present invention provides a touch screen device, including: a plurality of driving electrodes arranged in parallel for receiving a voltage; a plurality of sensing electrodes arranged in parallel in a direction intersecting the plurality of driving electrodes; and a plurality of sensing nodes overlapped by the driving electrodes and the sensing electrodes, wherein at least one driving electrode includes a plurality of cells and a plurality of connecting lines, and the plurality of cells is mutually connected through the plurality of connecting lines. At least one driving electrode may include a plurality of cell groups which include first cells arranged in first columns and second cells arranged in second columns, the first cells and the second cells may be mutually connected through the connecting lines, and the cells included in each cell group may be respectively connected to cells included in another cell group through the connecting lines. At least one sensing electrode may be divided into two or more signal lines. The divided signal lines may cross and recombine at connecting lines at which the first cells and the second cells are connected. The sensing nodes may be points at which the connecting lines and the signal lines overlap. The width of the signal lines may be less than the gap between two cells.

Advantageous Effects

According to the exemplary embodiments of the present invention, a capacitive touch screen device having excellent sensing performance may be obtained.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
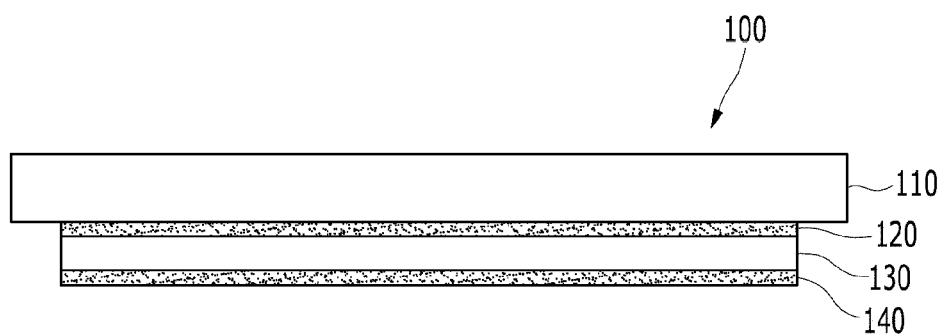
FIG. 1 is an exemplary sectional view of a touch screen device 100.

FIG. 1 is an exemplary sectional view of a touch screen device 100.

Referring to FIG. 1, the touch screen device 100 includes a protective window 110, a sensing electrode 120, a dielectric material layer 130 and a driving electrode 140. The sensing electrode 120, the dielectric material layer 130 and driving electrode 140 may collectively be referred to as an electrode layer.

The protective window 110 is disposed on the uppermost layer of the touch screen device and protects the electrode layer. One surface of the protective window 110 functions as a touch surface of the touch screen, and the other surface attaches to the electrode layer. Not only does the protective window protect the electrode layer from environmental hazards, but it also provides a dielectric material that is necessary between a touching body (for example, a user's finger) and the electrode layer.

The sensing electrode 120 and driving electrode 140 may be formed of conductive material. The sensing electrode 120 and driving electrode 140 are connected to a working circuit, sensing circuit, and other devices of the touch screen in order to determine whether there is a touch and operate the touch screen device 100.

Figure 2:
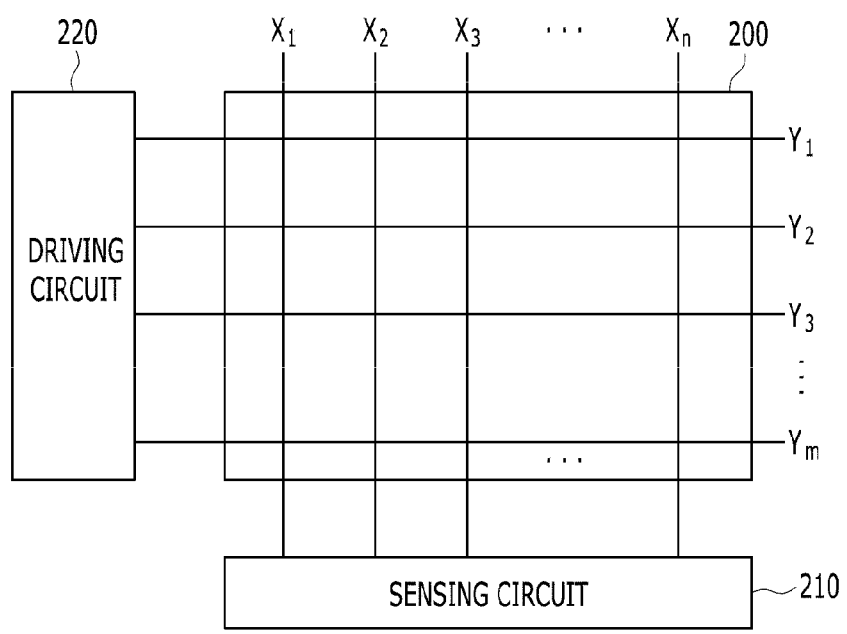
FIG. 2 is an exemplary block diagram of a touch screen device 100.

FIG. 2 is an exemplary block diagram of a touch screen device 100.

Referring to FIG. 2, a touch screen device 100 includes a touch panel 200, sensing circuit 210, and working circuit 220.

The touch panel 200 includes a plurality of sensing electrodes X1, X2, X3, ..., Xn and a plurality of driving electrodes Y1, Y2, Y3, ..., Ym that are insulated from one another. The sensing electrodes X1, X2, X3, ..., Xn correspond to the sensing electrode 120 in FIG. 1, and the driving electrodes Y1, Y2, Y3, ..., Ym correspond to the driving electrode 140 in FIG. 1. The sensing electrodes and driving electrodes have respectively been depicted with lines in FIG. 2 for the sake of convenience, but are actually embodied as an electrode pattern. In the present specification, sensing electrode may be used interchangeably with the terms sensing signal line, sensing line, sensing wire, and the like, and driving electrode may be used interchangeably with the terms driving signal line, driving line, driving wire, working electrode, working signal line, working line, working wire, and the like.

The sensing circuit 210 is electrically connected to a plurality of sensing electrodes X1, X2, X3, ..., Xn and measures a capacitance variation generated by a touch.

The working circuit 220 is electrically connected to a plurality of driving electrodes Y1, Y2, Y3, ..., Ym and sequentially or simultaneously applies a working waveform to the plurality of driving electrodes Y1, Y2, Y3, ... Ym.

Here, the greater the capacitance variation generated by a touch is, the better the sensing performance of the touch screen device 100 becomes.

Figure 3:
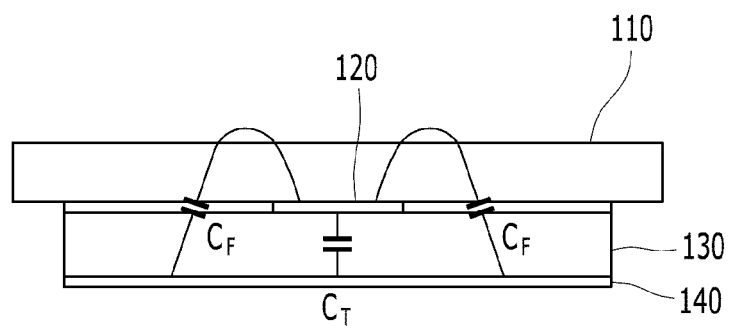
FIG. 3 is a diagram illustrating a variation in capacitance generated by a touch.
Figure 3:
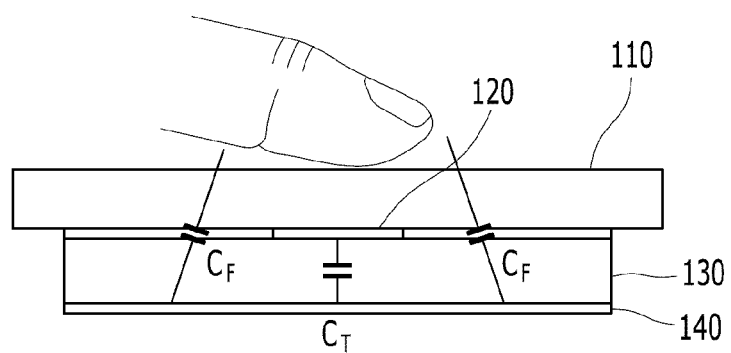

FIG. 3 is a diagram illustrating a variation in capacitance generated by a touch.

Referring to FIG. 3, (a) illustrates a capacitance generated on a touch screen device 100 when not touched by an object, and (b) illustrates a capacitance generated on the touch screen device 100 when touched by an object.

Here, a transparent capacitance $C_T$ denotes a capacitance generated when a sensing electrode 120 and a driving electrode 140 overlap. The transparent capacitance $C_T$ does not change, whether or not the touch of an object is present.

Meanwhile, a fringing capacitance $C_F$ denotes a capacitance generated when an electric field is formed between the sensing electrode 120 and driving electrode 140. When a voltage is applied to the driving electrode 140, an electric field is generated. If an object touches the touch screen device 100, the electric field diminishes at a portion where the sensing electrode 120 and driving electrode 140 do not overlap, and the fringing capacitance $C_F$ changes.

Equation 1 shows a capacitance variation of the touch screen device 100.

$$\Delta C_{signal} = \frac{C_F}{C_{tot}} = \frac{C_F}{C_T + C_F} \quad \text{(Equation 1)}$$

Here, $\Delta C_{signal}$ denotes a capacitance variation due to a touch by an object, $C_{tot}$ denotes the entire capacitance in the corresponding region, and $C_F$ denotes a fringing capacitance. The entire capacitance $C_{tot}$ is the sum of the transparent capacitance $C_T$ and the fringing capacitance $C_F$.

Equation 1 shows that when the transparent capacitance $C_T$ is reduced, the capacitance variation $\Delta C_{signal}$ can be increased.

A pattern configuration for reducing the transparent capacitance $C_T$ according to an exemplary embodiment of the present invention will be described below.

Figure 4:
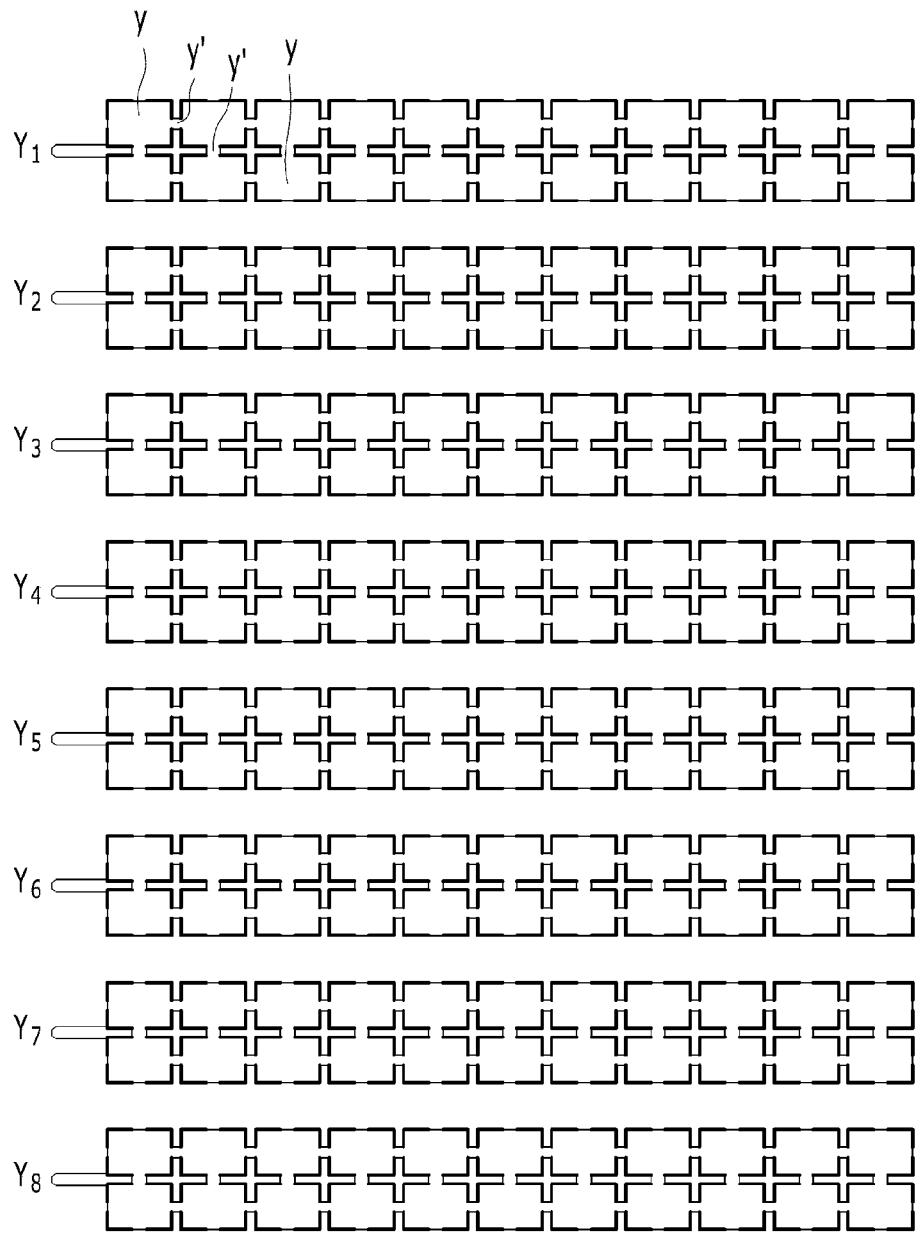
FIG. 4 is a diagram illustrating a driving electrode pattern structure according to an exemplary embodiment of the present invention.

FIG. 4 is a diagram illustrating a driving electrode pattern structure according to an exemplary embodiment of the present invention.

Referring to FIG. 4, the driving electrodes Y1, Y2, Y3, ..., Ym include a plurality of cells (y) and a plurality of connecting lines (y'), and the plurality of cells (y) is mutually connected through the plurality of connecting lines (y'). For the sake of convenience, cells are shown in a rectangle pattern, but are not limited thereto. The cells may be configured in various patterns including square, circular, elliptical, and diamond shaped patterns.

One driving electrode may be configured as a plurality of cell groups including a plurality of cells mutually connected through connecting lines. A cell group may be formed in a column unit or row unit. The cells included in each cell group are connected with the cells in another cell group through connecting lines.

One driving electrode is shown including two columns of cell groups in FIG. 4, but is not limited thereto. One driving electrode may include two or more columns of cell groups.

Figure 5:
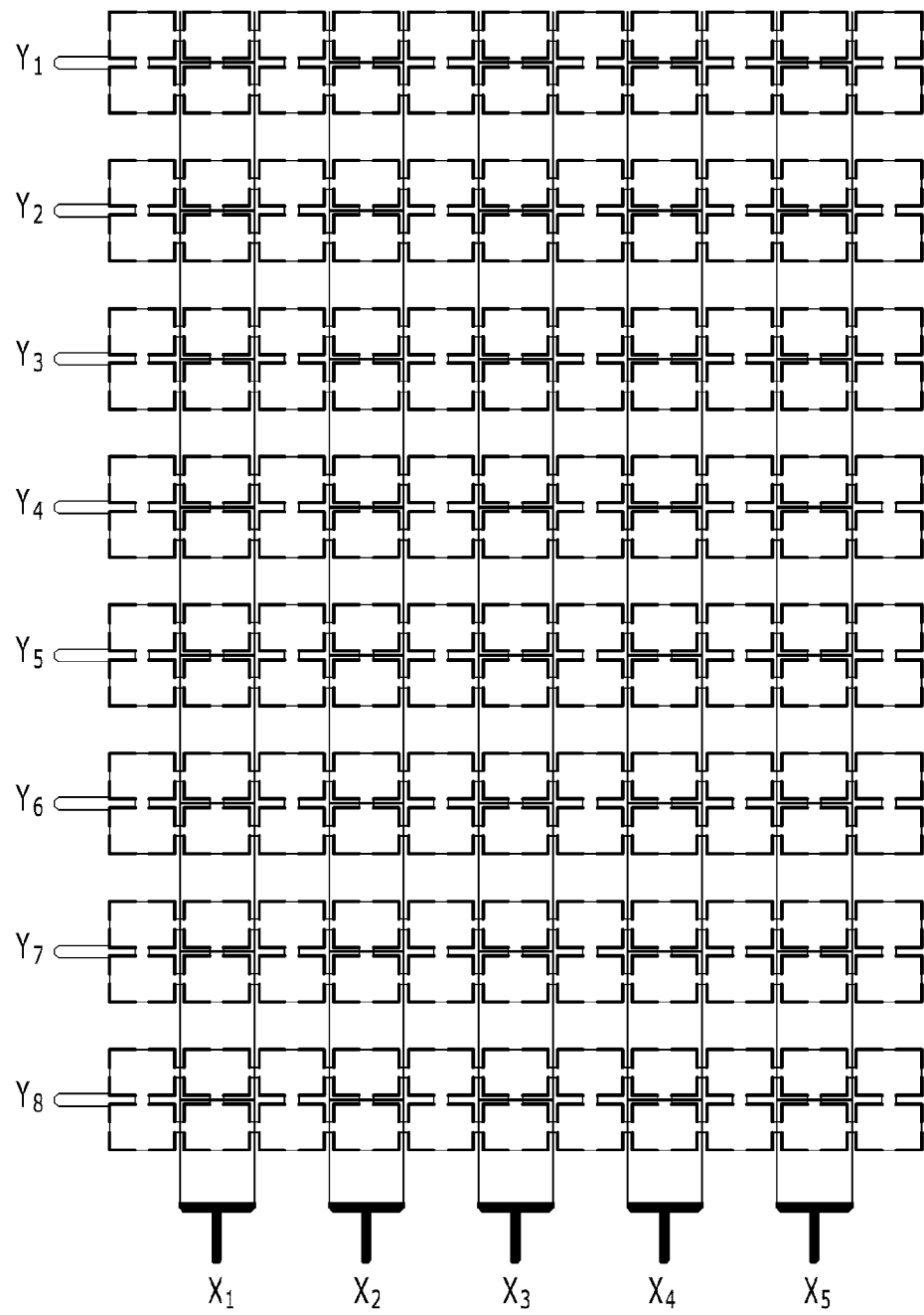
FIG. 5 is a diagram illustrating a sensing electrode and driving electrode pattern configuration according to an exemplary embodiment of the present invention.

FIG. 5 is a diagram illustrating a sensing electrode and driving electrode pattern structure according to an exemplary embodiment of the present invention. As the driving electrode pattern is the same as that in FIG. 4, a repetitive description will not be given.

Referring to FIG. 5, sensing electrodes X1, X2, X3, ..., Xn overlap with connecting lines (y') of driving electrodes. In the present specification, the points at which the sensing electrodes X1, X2, X3, ..., Xn overlap with the connecting lines (y') of the driving electrodes are referred to as sensing nodes.

One sensing electrode is divided into two signal lines, and the divided signal lines are overlapped with the connecting lines (y) to form sensing nodes. As shown in FIG. 5, the divided signal lines may be recombined to intersect connecting lines that connect each row in a driving electrode. Here, the width of the signal lines may be less than the gap between two cells (that is, the length of a connecting line connecting two cells). Specifically, other than the regions in which the signal lines of the sensing electrodes overlap with the connecting lines of the driving electrodes, there may be no overlap between the sensing electrodes and driving electrodes.

Likewise, when a touch panel pattern structure is configured so that the sensing lines of the sensing electrodes overlap with the connecting lines of the driving electrodes, the regions in which the sensing electrodes overlap with the driving electrodes are minimized. Accordingly, a transparent capacitance $C_T$ formed between a sensing electrode and a driving electrode is minimized, and the capacitance variation is maximized. That is, a touch screen device having excellent sensing performance may be obtained.

Figure 6:
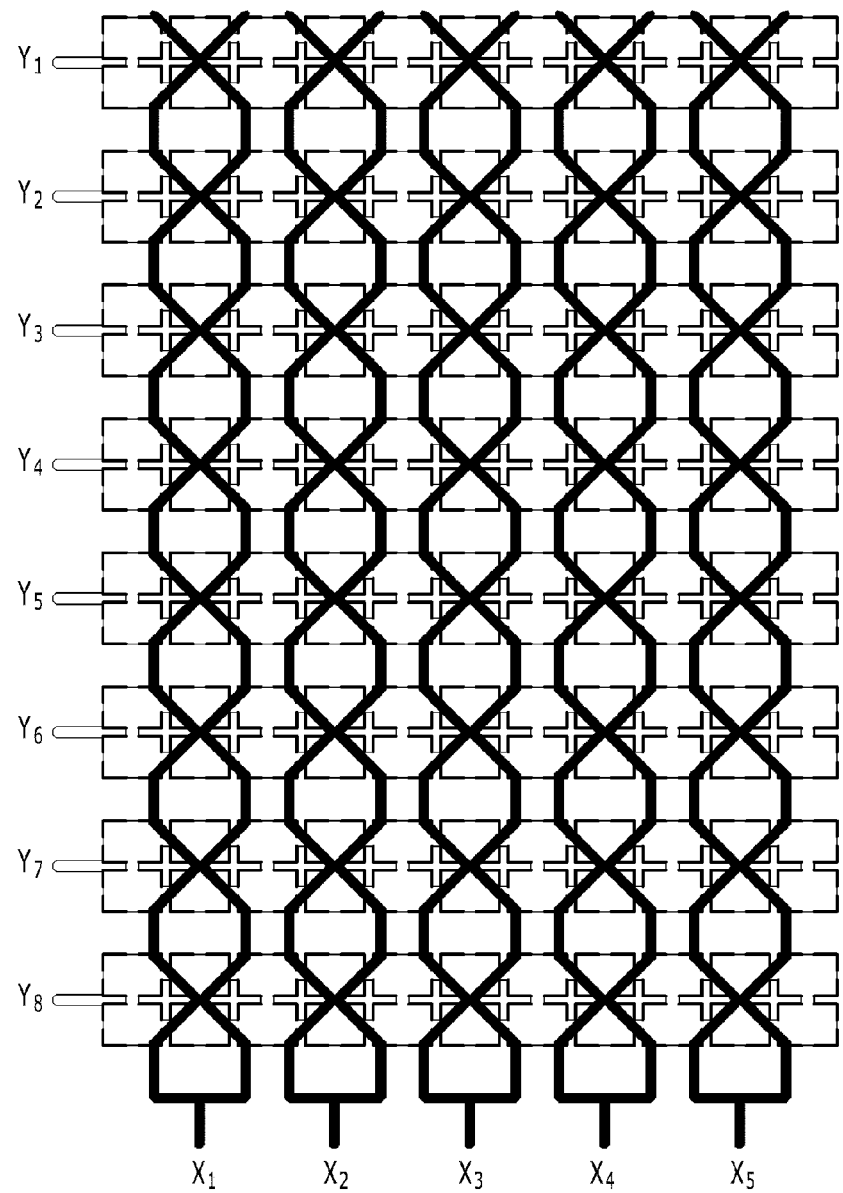
FIG. 6 is a diagram illustrating a sensing electrode and driving electrode pattern structure according to another exemplary embodiment of the present invention.

FIG. 6 is a diagram illustrating a sensing electrode and driving electrode pattern structure according to another exemplary embodiment of the present invention. As the driving electrode pattern is the same as that in FIG. 4, a repetitive description will not be given.

FIG. 6 shows a repeating structure in which one sensing electrode is divided into two signal lines, is recombined at one point, and is divided again. The divided signal lines overlap a connecting line, which connects each column in a driving electrode, to form a sensing node. Further, at a point where the divided signal lines recombine, the divided signal lines overlap a connecting line, which connects each row in a driving electrode, to form a sensing node.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A capacitive type touch screen device, comprising:
a plurality of driving electrodes; and
a plurality of sensing electrodes disposed over and overlapping with the plurality of driving electrodes,
wherein:
at least one of the driving electrodes comprises a plurality of cells and a plurality of connecting lines, and the plurality of cells are mutually coupled through the plurality of connecting lines;
the plurality of cells include a first column cell group and a second column cell group;
the connecting lines include first connecting lines and second connecting lines; and
for each row, the cells included in the first column cell group are respectively coupled to the cells included in the second column cell group through the first connecting lines.

2. The capacitive type touch screen device of claim 1, wherein portions of the sensing electrodes overlap with the connecting lines.

3. The capacitive type touch screen device of claim 1, wherein at least one of the sensing electrodes is divided into two or more lines, and the divided lines overlap with the second connecting lines.

4. The capacitive type touch screen device of claim 3, wherein the divided lines are recombined at predetermined points,
wherein neighboring cells included in the first column cell group are coupled to each other through a corresponding one of the second connecting lines, and neighboring cells included in the second column cell group are coupled to each other through a corresponding one of the second connecting lines, and
wherein the predetermined points overlap with the first connecting lines.

5. The capacitive type touch screen device of claim 1, wherein at least one of the sensing electrodes is divided into two or more lines, which have a parallel structure that is recombined at least once.

6. The capacitive type touch screen device of claim 5, wherein the divided lines overlap with the second connecting lines.

7. A touch screen device, comprising:
a plurality of driving electrodes arranged in parallel and receiving a voltage;
a plurality of sensing electrodes disposed over the plurality of driving electrodes and arranged in parallel in a direction intersecting the plurality of driving electrodes; and
a plurality of sensing nodes at intersections of the driving electrodes and the sensing electrodes,
wherein:
at least one of the driving electrodes includes a plurality of cells and a plurality of connecting lines, and the plurality of cells are mutually coupled through the plurality of connecting lines;
the plurality of cells includes first cells arranged in a first column and second cells arranged in a second column;
the first cells and the second cells are mutually coupled through the connecting lines including first and second connecting lines; and
for each row, the first cells included in the first column are respectively coupled to the second cells included in the second column through the first connecting lines.

8. The touch screen device of claim 7, wherein at least one of the sensing electrodes is divided into two or more signal lines.

9. The touch screen device of claim 8, wherein neighboring first cells in the first column are coupled to each other through a corresponding one of the second connecting lines, and neighboring second cells in the second column are coupled to each other through a corresponding one of the second connecting lines, and
wherein the divided signal lines intersect and recombine at the first connecting lines.

10. The touch screen device of claim 8, wherein the sensing nodes are points at which the connecting lines and the signal lines intersect.

11. The touch screen device of claim 8, wherein a width of the signal lines is less than a gap between two neighboring cells of the plurality of cells in a same row or in a same column.

* * * * *